K. D. PIERCE & S. C. ELLIS.
FRUIT PICKER.
APPLICATION FILED SEPT. 25, 1911.
1,024,358.
Patented Apr. 23, 1912.
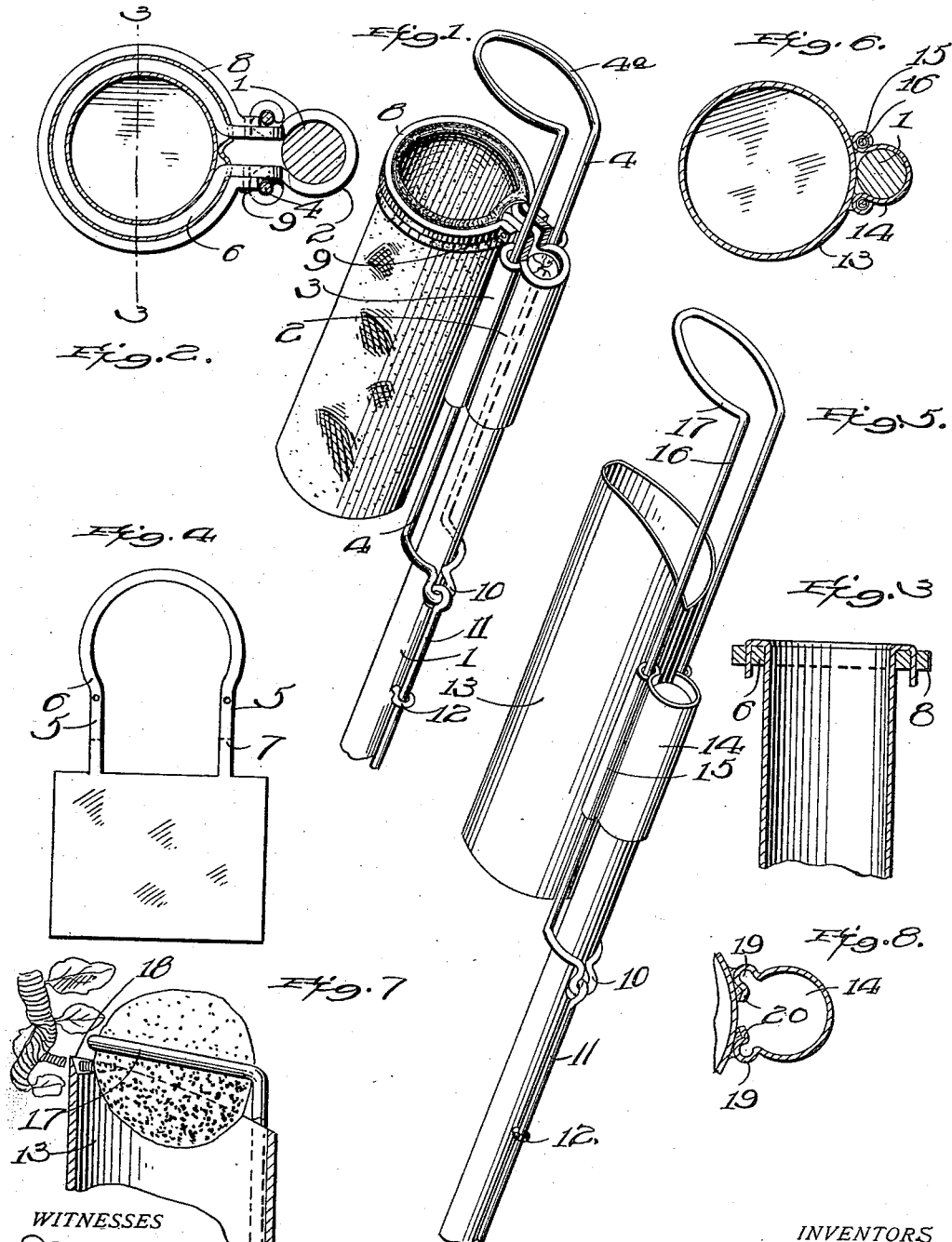
INVENTORS
Kirk D. Pierce
Sidney C. Ellis

UNITED STATES PATENT OFFICE.

KIRK D. PIERCE, OF HILLSBORO, AND SIDNEY C. ELLIS, OF KEENE, NEW HAMPSHIRE.

FRUIT-PICKER.

1,024,358.  Specification of Letters Patent.  Patented Apr. 23, 1912.

Application filed September 25, 1911. Serial No. 651,119.

*To all whom it may concern:*

Be it known that we, KIRK D. PIERCE and SIDNEY C. ELLIS, citizens of the United States, residing, respectively, at Hillsboro, county of Hillsboro, and State of New Hampshire, and at Keene, in the county of Cheshire and State of New Hampshire, have invented certain new and useful Improvements in Fruit-Pickers, of which the following is a specification, reference being had therein to the accompanying drawing.

This invention relates to fruit pickers and has for its object the production of a simple and efficient device to which the ordinary paper or fabric sack may be attached so that the fruit may be placed in the bags without the necessity of emptying the picker and filling other bags to receive the fruit.

Another object of this invention is the production of a simple and efficient device which may be cheaply manufactured and will also easily sever the fruit from the trees.

With these and other objects in view this invention consists of certain novel constructions, combinations and arrangements of parts as will be hereinafter fully described and claimed.

In the drawings: Figure 1 is a perspective view of one form of the picker. Fig. 2 is a top plan view partly in section thereof. Fig. 3 is a section taken on line 3—3 of Fig. 2. Fig. 4 is a view of the blank out of which the socket and bag support is constructed. Fig. 5 is a perspective view of the modified form of the invention. Fig. 6 is a transverse section thereof. Fig. 7 is an enlarged section of the upper end of the structure disclosed in Fig. 5 showing the cutting edge formed upon the fruit receptacle. Fig. 8 is a transverse section showing an embodiment of the means for connecting the handle receiving socket to the fruit receiving receptacle.

Referring to the drawings by numerals 1 designates the handle, the upper end of which fits in a socket 2 which socket is preferably formed from a blank of material as disclosed in Fig. 4. The side edges of the blank disclosed in Fig. 4 are rolled as illustrated in Fig. 1 and indicated by the numeral 3 so as to form guide ways for the arms 4 of the grasping loop 4ª. The body portion of the socket is bowed outwardly so as to form a channel for the upper end of the handle which is illustrated in Fig. 1, and extending upwardly from the upper edge of the blank are a pair of straight portions 5 terminating in a loop portion 6. The straight portions 5 are bent upon the dotted lines 7 at right angles to the socket 2 as illustrated in Fig. 1 and the loop portion 6 is adapted to receive the upper end of a bag made of paper, fabric, or any other suitable material. A clamping ring 8 is pivotally secured at 9 to the straight portions 5 of the bag supporting member and is adapted to clamp over the loop portions 6 as illustrated in Figs. 1 and 3 for firmly holding the bag in position.

It will be obvious that by the use of the present device the bags may be readily attached to the fruit picker and the same, as soon as they become full, may be detached from the picker and tied up thereby doing away with the necessity of refilling every bag for shipment, etc. The bags, of course, may be easily detached by swinging the clamping ring 8 over the loop portion 6 and a new bag readily replaced for the old one.

The lower ends of the arms 4 are bent so as to encircle the handle 1 and said arms terminate into a loop or eye 10 which eye is engaged by means of an operating rod 11. This operating rod 11 passes through a guide eye 12 which guide eye is attached to the handle 1. The loop portion 4ª extends over the mouth of the bag and it will be obvious that as the loop portion 4ª is placed over the fruit and the arms 4 are slid within the rolled portion 3, the fruit will be pulled from its branch and drop directly into the receptacle or bag.

As disclosed in Fig. 5, the fruit receptacle 13 may be made of rigid material such as metal or any other suitable material which will answer the purpose and the socket 14 is fixedly secured to the rear face of the receptacle 13, in any suitable manner. The socket 14, like the socket 2 is also provided with rolled portions 15, which rolled portions act as guide channels for the arms 16 of the fruit engaging loop 17. The socket 14 is secured to the receptacle 13 intermediate its ends, thereby forming an efficient support or brace for said receptacle. The lower ends of the arm 16 are formed in a similar manner to that as just described in Fig. 1. The front end or the receptacle 13 is sharpened as illustrated at 18 so as to form a cutting edge to sever the fruit from the branches carrying the same. The upper edge of the receptacle 13 is inclined toward its rear face as illustrated in Figs. 5 and 7 and it will be obvious that as the loop portion 17, which engages the fruit, pulls the fruit down into the receptacle 13, the branch will be brought into engagement with the cutting edge 18 as illustrated in Fig. 4 and the fruit being severed therefrom will readily drop into the receptacle.

In Fig. 8 there is shown a modified form wherein the socket 14 is provided near its inner face with a pair of bulged portions 19 which bulged portions act as guides or channels for the arms of the fruit picker loop. The inner ends of the socket 14 are bent inwardly as illustrated at 20 thereby forming an efficient securing means for said socket to the fruit receiving receptacle.

What is claimed is:—

1. A fruit picker of the class described comprising a socket formed from a blank sheet of material and being provided with a pair of rolled portions constituting guide ways, a loop portion carried by the upper end of said socket, and being bent at right angles to said socket, clamping means pivotally secured to said loop portion and adapted to fit over the same for clamping the bag upon said loop portion and a fruit engaging member working in said guide ways and overhanging said first mentioned loop portion for separating fruit from the tree and depositing the same within said bag.

2. The combination with a pole, of a socket having rolled portions on each side thereof extending the entire length of said socket, a receptacle carried by said socket, a fruit engaging member slidably mounted in said rolled portions and having its lower end partially encircling said pole for forming a guiding loop for said fruit engaging member whereby said loop will be held in engagement with said pole, and means engaging said guiding loops for reciprocating the same within said rolled portion.

In testimony whereof we hereunto affix our signatures in presence of two witnesses.

KIRK D. PIERCE.
SIDNEY C. ELLIS.

Witnesses as to the signature of Kirk D. Pierce:
RALPH G. SMITH,
CHAS. H. SLEEPER.

Witnesses as to the signature of Sidney C. Ellis:
FRANK C. EMERSON,
CORA E. ELLIS.